March 25, 1969     W. L. DUDA ET AL     3,435,447

LIGHT DEFLECTING MECHANISMS

Filed March 1, 1965     Sheet 1 of 2

INVENTORS
WILLIAM L. DUDA
HAROLD FLEISHER
WERNER W. KULCKE
ERHARD MAX

BY Ralph E. Dustin

ATTORNEY

United States Patent Office 3,435,447
Patented Mar. 25, 1969

3,435,447
LIGHT DEFLECTING MECHANISMS
William L. Duda, Wappingers Falls, Harold Fleisher and Werner W. Kulcke, Poughkeepsie, and Erhard Max, Wappingers Falls, N.Y., assignors to International Business Machines Corporation, New York, N.Y., a corporation of New York
Filed Mar. 1, 1965, Ser. No. 436,109
Int. Cl. H04l 3/00; G08c 9/00, 11/00
U.S. Cl. 340—347                             8 Claims

ABSTRACT OF THE DISCLOSURE

Light deflecting apparatus including control circuits for light deflectors which perform the Exclusive-OR logical function on a given stage of the deflector and the next succeeding stage in activating the polarization rotators of the deflector. Thus, if the control circuits are energized at locations representative of different values, light deflection takes place through the deflector to positions representative of the sum of the values.

---

This invention relates to light deflectors, and more particularly to light deflectors having control circuits which may be energized by pulses applied at points representative of different values to effect a deflection of light to positions representative of the sum of the values.

There is described in a patent application, Ser. No. 285,832, filed June 5, 1963 by T. J. Harris et al., a light deflector including birefringent crystals through which a linearly polarized light beam passes over one or another of two paths depending on the direction in which the light beam is polarized. At the input side of each crystal is an electro-optic device which normally passes linearly polarized light without changing its direction of polarization. Under these conditions the light may be polarized in such a plane that it passes through the associated birefringent crystal as an ordinary ray. When a half wave voltage is applied, however, to the electro-optic device, the plane of polarization is rotated 90 degrees and the light beam passes through the birefringent crystal as an extraordinary ray. The ordinary and extraordinary rays leave the crystal at points spaced laterally of each other distances which are directly proportional to the thickness of the crystal. By providing a deflector having several birefringent crystals, each having a thickness proportional to some assigned numeric value and also having an electro-optic device at its input side, it is possible to obtain a deflection of a light beam to any position representative of the sum of the values assigned to crystals which were made effective by the energizing of electro-optic devices.

In the application mentioned above, each electro-optic device in a multi-stage deflector is energized and de-energized independently of the other electro-optic devices by the closing and opening of a switch. If the light beam entering any selected stage is polarized in a direction to pass through its crystal as an ordinary ray and it is desired that deflection take place in such stage, then the switch for the electro-optic device at the stage input must be closed. The switch for the electro-optic device of the following stage must also be closed if the light deflection is to be limited to the selected stage, otherwise the light will remain polarized in a direction to be deflected in each stage through which is passes.

It has been discovered that control circuits may be provided for energizing the electro-optic devices of a multi-stage deflector in such a manner that the output of the last stage is always located at a point representative of the sum of the numeric values of different stages to which input pulses are delivered. The deflection values of the different stages may either be the same or different depending on the manner in which the deflector is to be used. By making each stage of a deflector equal in deflection value, there is obtained an output located at a position representative of the sum of the one's in a binary number applied to the deflector. When the thickness of the birefringent crystals vary according to different numeric values, the position of the output for the deflector is proportional to the sum of the values assigned to crystals having electro-optic devices which were pulsed. By serially pulsing positions increasing in value by one, a scanning action is obtained at the output. The thickness of the birefringent crystals may be varied in a manner to give an independent discrete output position for all possible combinations of switch closings. The preferred thickness variation in such case is one in which each crystal exceeds the thickness of the preceding crystal by a factor of two. By providing each stage of a deflector with two crystals of the same thickness, each having its own electro-optic device, and increasing the thickness of the crystals from one stage to the next by a factor of two, it is possible to energize the electro-optic devices for the two sets of crystals according to different binary numbers and obtain an output representative of the sum of the two numbers. Regardless of the thickness of the crystals employed in each deflector, the electro-optic devices are energized through "exclusive or" circuits in such a manner that a pulse which energizes the electro-optic device of one stage also energizes the electro-optic device for the next succeeding stage unless another pulse is also delivered to that stage. Also, a pulse delivered to any stage is effective to energize its electro-optic device only when there has been no pulse delivered to the next preceding stage.

An object of this invention is to provide a light deflector having electro-optic devices which are energized by improved control circuits.

Another object is to provide a light deflector having a plurality of stages to which electric pulses may be delivered for effecting light deflection, and the position of the light output for the last stage being representative of the sum of the stages to which pulses are delivered.

Still another object is to provide a multi-stage light deflector to which pulses may be applied successively for providing a scanning action of the light at the output.

Yet another object is to provide an improved light deflector having electro-optic devices which may be energized by pulses representative of different binary numbers and produce an output at a position representative of the sum of the two numbers.

The foregoing and other objects, features and advantages of the present invention will be apparent from the following more particular description of the preferred embodiments of the invention as illustrated in the accompanying drawings.

Figure 1:
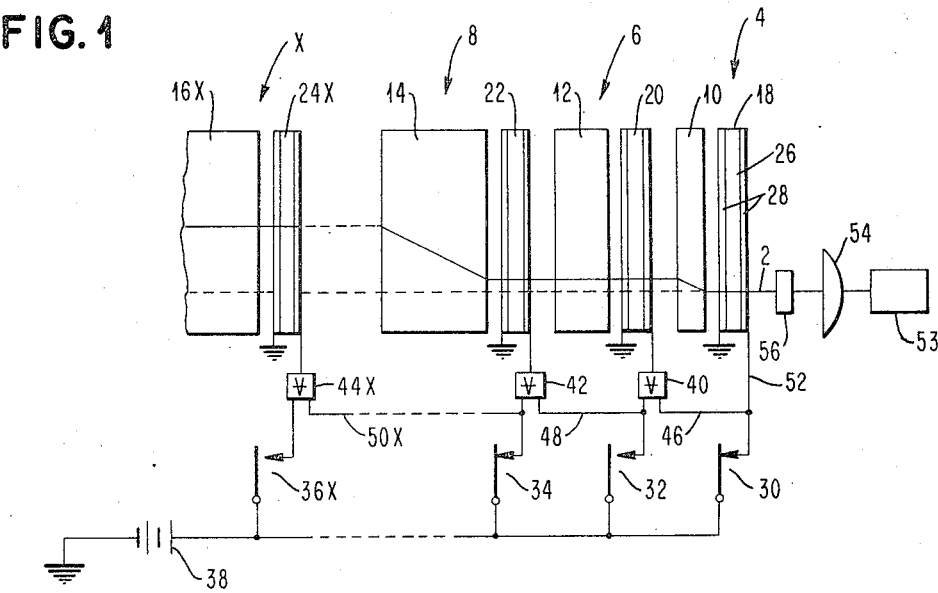
FIG. 1 is a schematic diagram of apparatus for deflecting a light beam vertically to a level representative of the sum of values assigned to points at which pulses are delivered to a control circuit.

Referring to the drawings, and more particularly to FIG. 1, it will be noted that there is shown a multi-stage light deflector capable of deflecting a beam 2 of linearly polarized light vertically to positions representative of the sum of the deflection values for the stages which are made effective by a closing of switches. There are provided, as shown, light deflection stages 4, 6, 8, X which are operable to deflect light vertically distances increasing by a factor of two. The deflection stages include birefringent elements 10, 12, 14 and 16X which may be crystals cut specially to allow incoming plane polarized light to pass through them in one path or another as either an ordinary ray or an extraordinary ray but not both simultaneously. The path followed depends upon the direction in which the beam entering the crystal is polarized. A beam plane polarized perpendicular to the plane of the drawing will pass, for example, through the crystal without deflection as the ordinary ray. If the light is polarized parallel to the plane of the drawing, it will be deflected and pass as the extraordinary ray over a different path. The spacing between the points at which the ordinary and extraordinary rays leave the crystal is directly proportional to the thickness of the crystal. To provide deflection stages increasing by a factor of two, the thickness of the crystals used in these stages must increase by the same factor.

At the input sides of the birefringent elements 10, 12, 14 and 16X are electro-optic devices 18, 20, 22 and 24X. Each of these devices is made up of an electro-optic crystal 26 between a pair of transparent electrodes 28. When a potential of sufficient magnitude is applied across any one of the electro-optic devices, a rotation of the plane of polarization of the light by 90 degrees takes place. For applying such a potential selectively across these devices, one electrode of each device is connected to ground while the other electrodes are connected through switches 30, 32, 34 and 36X to one side of a potential source 38 which is connected at its other side to ground. The electro-optic devices for all stages except the first are connected to their respective switches through "exclusive-or" circuits 40, 42 and 44X, and are also connected through their "exclusive-or" circuits and conductors 46, 48 and 50X to the switches for the next preceding stage. The electro-optic device for the first stage is connected directly to its switch 30 through a conductor 52. Mechanical switches are shown herein only to provide an understanding of the invention. In actual practice, electronic switching means responsive to coded electric pulses would be used. The potential at the source 38 is of sufficient magnitude to effect a rotation of the plane of polarization of the light beam by 90 degrees as it passes through any one of the electro-optic devices having a potential applied across it by the closing of a switch.

The beam of light 2 is supplied from a suitable source, such as a laser 53, through a collimating lens 54 and a polarizer 56 to the electro-optic device 18 of the first stage polarized in a plane perpendicular to the plane of the drawing. If all of the switches were open, the light beam would pass through the birefringent elements without deflection as the ordinary ray. With the switch 30 closed, as shown, the electro-optic device 18 is energized to effect a rotation of the plane of polarization by 90 degrees so the light beam is deflected in crystal 10. The closing of switch 30 also applies a voltage through conductor 46 to the "exclusive-or" circuit 40. With switch 32 open, a voltage is applied through circuit 40 to the electro-optic device 20 for effecting a rotation of the plane of polarization 90 degrees to its original plane. If the switch 32 had been closed there would be no voltage applied from the "exclusive-or" circuit 40 to the electro-optic device 20 and the polarization of the light would have remained in the plane to which it was rotated by the device 18. The light beam would then be deflected in crystal 12 the same as it was in crystal 10. With switch 32 open, however, the light beam passes through crystal 12 without deflection. Switch 34 being closed while switch 32 is open results in the energizing of the electro-optic device 22 to rotate the plane of polarization 90 degrees and effect a deflection of the light beam in crystal 14. The "exclusive-or" circuit at the next higher stage is conditioned, if the switch at that stage is open, to energize the next electro-optic device and rotate the plane of polarization again 90 degrees. Assuming that the switches 30, 32, 34, 36X are assigned values corresponding to the values of the birefringent elements 10, 12, 14, 16X with which they are associated, then the total value of the light deflection is equal to the total of the values assigned to the switches which are closed. With the switches 30 and 34 closed, as shown, the total of the light deflection obtained is five units since crystal 10 produces a deflection of one unit while crystal 14 produces a deflection of four units. It will be appreciated that the output of light from the final stage may be at any value from zero to the sum of the values assigned to the switches at all of the stages.

Figure 2:
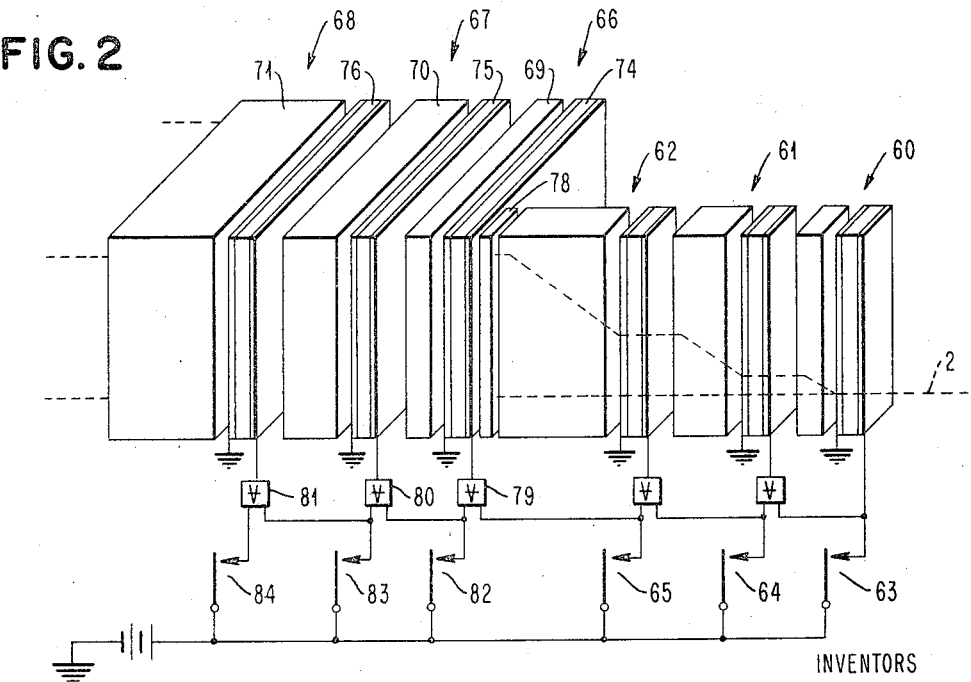
FIG. 2 is a schematic diagram of a system like that of FIG. 1 but having both vertical and horizontal deflectors.

There is shown in FIG. 2 a light deflector in which the first three stages 60, 61 and 62 are like those of FIG. 1 and deflect the light beam vertically in response to the closing of switches 63, 64 and 65. The next three stages 66, 67 and 68 have birefringent elements 69, 70 and 71 turned 90 degrees relative to the birefringent elements of the first three stages so that deflection of light in these stages takes place in a horizontal direction. At the input sides of the elements 69, 70 and 71 are electro-optic devices 74, 75 and 76 like those of the first three stages. The thickness of the elements 69, 70 and 71 increases by a factor of two from right to left as it does for the birefringent element of the first three stages. It is possible to obtain with this arrangement an output of light from element 71 at any one of points 0 to 7 spaced vertically in any one of columns 0 to 7 spaced horizontally. A closing of switches 63, 64 and 65 alone or in combination results in an output of light from element 71 at one of the points 0 to 7 in a vertical plane including the light beam 2. Since light passing through the birefringent elements of the first three stages as either an ordinary or extraordinary ray would pass through the elements 69, 70 and 71 as the opposite type of ray due to their change in angular positions by 90 degrees, it is necessary that a half wave plate 78 be located between the output of stage 62 and the electro-optic device 74 for the first horizontal deflecting stage. The electro-optic devices 74, 75 and 76 are energized through "exclusive-or" circuits 79, 80 and 81 and switches 82, 83 and 84 in the same manner as the electro-optic devices for the stages 61 and 62.

When all of the switches are open, the light beam passes through the first three stages polarized in a plane perpendicular to the plane of the drawing and no deflection takes place. The plane of polarization is then rotated 90 degrees by the half wave plate 78 and passes through the next three stages polarized in a plane parallel to the plane of the drawing. Still no deflection takes place due to the orientation of the birefringent elements 69, 70, 71 and light leaves the last element near its lower front corner.

If the switches 63, 64 and 65 were closed, the light beam would be deflected upwardly in each of the first three stages. It would pass from stage 62 through the half wave plate 78 so it would be conditioned for deflection in the next three stages. The closing of switch 65, however, would energize the electro-optic device 74 so the plane of polarization would be rotated again to a plane in which the light beam passes through the last three stages without deflection. Light output from element 71 would then be located at the uppermost point in the forward plane. A closing of switches 82, 83 and 84 alone or in combination would cause a deflection of the light beam from one to seven units horizontally depending on the values assigned to the elements whose associated switches were closed.

Figure 3:
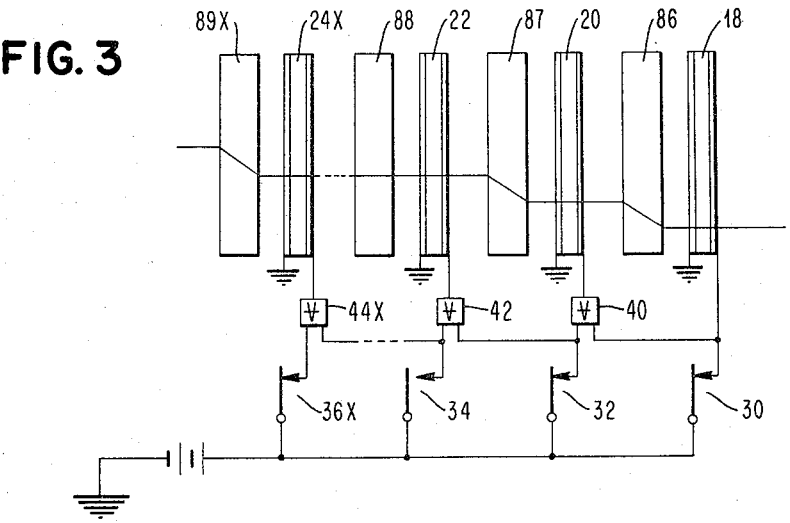
FIG. 3 is a schematic diagram of a system similar to FIG. 1 but having equal values assigned to the different deflector stages.

There is shown in FIG. 3 a system like that of FIG. 1 except that each of the birefringent elements 86, 87, 88 and 89X is of the same thickness and has assigned to it a value of one. Electro-optic devices 18, 20, 22 and 24X at the input sides of the birefringent elements are energized through circuitry including "exclusive-or" circuits 40, 42, 44X and switches 30, 32, 34 and 36X the same as in FIG. 1. With this arrangement, the output point of the light beam from the last deflection stage is representative of the number of ones in a binary number assuming that the switches at positions corresponding to the binary ones are closed while those at positions corresponding to binary zeros are left open. With the switches 30, 32 and 36X closed as shown, the output light appears at position three indicating that a binary number having three ones was applied to the system.

Figure 4:
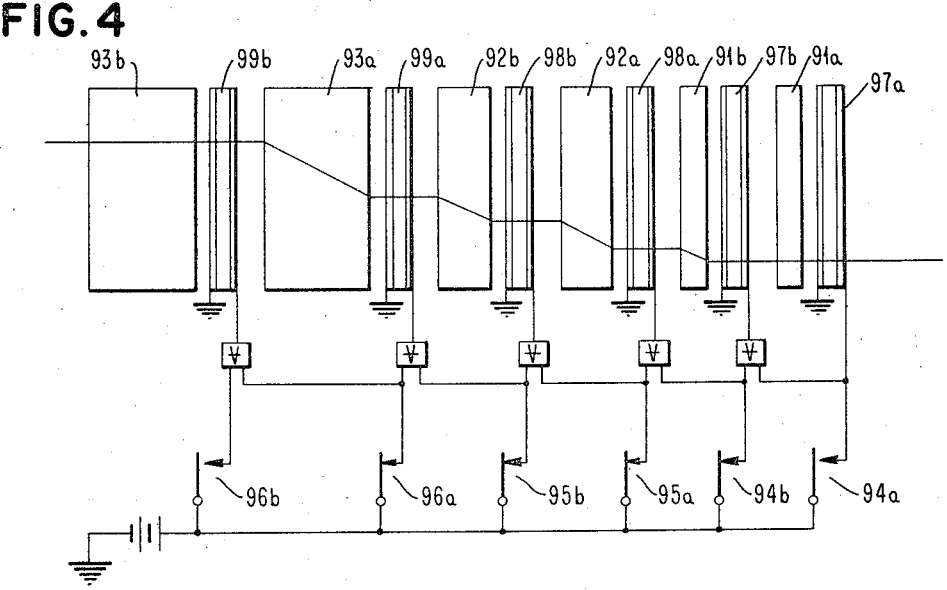
FIG. 4 is a diagram of a light deflector having different stages arranged in a manner to produce a light output at points representative of the sum of two binary numbers.

In FIG. 4 there is shown an arrangement of light deflection stages in which the output position of the light at the last stage is representative of the sum of two binary numbers. The arrangement consists of two sets of deflection elements, each set including birefringent elements increasing in thickness by a factor of two. One set of elements, numbered 91a, 92a and 93a, is interspersed with the other set numbered 91b, 92b and 93b. Switches 94a, 95a and 96a control the energizing of electro-optic devices 97a, 98a and 99a for the first set of elements while switches 97b, 98b and 99b control the energizing of electro-optic devices for the second set. As shown in FIG. 4, switches 95a and 96a of the first set are closed while switch 94a is open. These positions of the switches represent the binary number 110. Only switches 94b and 95b of the second set are closed as a representation of the binary number 011. Adding the two binary numbers gives 1001 which is equal to the decimal number 9, and it will be noted from the drawing that the energizing of the electro-optic devices through the "exclusive or" circuits effects a deflection of the light beam in elements 91b, 92a, 92b and 93a for a total number of nine units. It will be appreciated that the birefringent elements of the two sets need not be interspersed as shown but could be arranged with one set following the other or in any other arrangement desired. It is only necessary that the switches for each set be operated to control the deflection of light in birefringent elements at positions corresponding to those in the binary numbers for which the switches were operated.

In each of the systems shown there may be provided, if desired, at each output position of the final deflection stage a light responsive device which either provides an indication when light is directed upon it from the deflector or effects some operation in accordance with the deflection obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Light deflecting apparatus comprising, in combination:
    a plurality of light deflecting stages through which a beam of linearly polarized light may be passed either with or without deflection depending on its plane of polarization,
    means for directing through said stages a beam of light polarized in a plane to pass normally therethrough without deflection,
    an electro-optic device at the input side of each deflecting stage operable when energized to rotate the plane of polarization by 90 degrees,
    a switch associated with each electro-optic device, and means coupling each electro-optic device except the first electro-optic device to its associated switch and to the switch of the next preceding stage, the first electro-optic device being directly coupled to its associated switch, so that an electro-optic device is energized when the switch associated with such device is closed if the switch for the next preceding stage is open and so that the next succeeding electro-optic device is also energized when the switch associated with that succeeding stage is open.

2. The light deflecting apparatus of claim 1 in which said last mentioned means includes an "exclusive-or" circuit connected to each electro-optic device except for the first stage,
    and means for energizing each "exclusive-or" circuit from either or both of the switches of the associated stage and the next preceding stage.

3. The light deflecting apparatus of claim 1 in which each stage includes a birefringent element which passes light either as an ordinary ray or an extraordinary ray depending on the direction of its plane of polarization,
    and said birefringent elements increase in thickness by a factor of two from one stage to the next whereby the light output at the last stage is located at a position representative of the sum of the values in a binary number at locations corresponding to stages made effective by a closing of switches.

4. The light deflecting apparatus of claim 1 in which each stage includes a birefringent element which passes light either without deflection as an ordinary ray or with deflection as an extraordinary ray depending on the direction of its plane of polarization,
    some of said birefringent elements being oriented to deflect light in a given plane and others being oriented to deflect light in a plane at 90 degrees to said given plane,
    and a half wave plate arranged between said birefringent elements deflecting light in a plane at 90 degrees relative thereto.

5. The apparatus of claim 4 in which the thickness of said elements deflecting light in one plane increases by a factor of two and the thickness of said elements deflecting light in a plane at 90 degrees relative thereto corresponds to that of the first mentioned elements and increases in the same order.

6. Light deflecting apparatus comprising, in combination:
    a plurality of light deflecting stages,
    each of said stages including a birefringent element of unit thickness through which linearly polarized light may be passed either without deflection as an ordinary ray or with deflection as an extraordinary ray depending on the plane of polarization,
    an electro-optic device at the input side of each birefringent element operable when energized for rotating the plane of polarization by 90 degrees,
    a switch associated with each electro-optic device and representative of a binary one when closed and a binary zero when open,
    an "exclusive-or" circuit connected between each electro-optic device and its associated switch as well as the switch of the next preceding stage,
    and means for directing through said stages a beam of light polarized in a plane to pass normally therethrough as an ordinary ray,
    said light beam being deflected in birefringent elements following electro-optic devices whose associated switches are closed so the light output at the last stage is at a position representative of the sum of ones in a binary number represented by positions of said switches.

7. Apparatus for deflecting a light beam to positions representative of the sum of two binary numbers comprising, in combination:
    two sets of light deflection stages arranged in alignment so that a beam of light passes through them serially,
    the light deflection stages of each set including birefringent elements increasing in thickness by a factor of two,
    an electro-optic device at the input side of each birefringent element,
    means including a switch associated with each electro-optic device and operable when closed for energizing its associated device if the switch for the next preceding stage is open, each switch also effecting an energizing of the electro-optic device for the next succeeding stage if the switch for the latter stage is open, each of said switches being representative of a binary one when closed and a binary zero when open, and means for directing through said stages a beam of light polarized in a plane to pass normally therethrough as an ordinary ray, said lgiht beam being deflected in birefringent elements following electro-optic devices whose associated switches are closed so the light output at the last stage is at a position representative of the sum of two binary numbers, each corresponding to positions of a different set of switches.

8. The apparatus of claim 5 in which said means for energizing said electro-optic devices includes "exclusive-or" circuits, each connected between an electro-optic device and its associated switch as well as the switch for the next preceding stage.

References Cited

UNITED STATES PATENTS

Re. 26,170  3/1967  Harris _____ 88—1.0
3,290,619  12/1966  Geusic et al. _____ 350—150

OTHER REFERENCES

W. V. Smith: "Electro-Optic Deflection Device," IBM Technical Disclosure, vol. 6, No. 12, May 1964.

MAYNARD R. WILBUR, *Primary Examiner.*

JEREMIAH GLASSMAN, *Assistant Examiner.*

U.S. Cl. X.R.

350—150, 157